United States Patent
Yamamoto et al.

(10) Patent No.: US 6,334,332 B1
(45) Date of Patent: Jan. 1, 2002

(54) LOW TEMPERATURE WASTE CRUSHING SYSTEM TAKING ADVANTAGE OF COLD SHORTNESS

(75) Inventors: Makoto Yamamoto; Yukio Hirano; Seiichiro Matsuda; Yasuhiro Hirao; Choiku Yoshikawa; Kazutoshi Ito, all of Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/589,363

(22) Filed: Jun. 8, 2000

(30) Foreign Application Priority Data

Sep. 30, 1999 (JP) ............................. 11-279661

(51) Int. Cl.[7] ...................... F25D 17/02; F25D 13/04; F25B 7/00
(52) U.S. Cl. ................. 62/434; 62/65; 62/335
(58) Field of Search ................ 62/430, 434, 65, 62/335

(56) References Cited

U.S. PATENT DOCUMENTS

| 2,609,150 A | * | 9/1952 | Bludeau ..................... 62/65 |
| 4,072,026 A | * | 2/1978 | Oberpriller et al. ......... 62/63 |
| 4,850,199 A | * | 7/1989 | DiNovo et al. .............. 62/114 |
| 5,447,038 A | * | 9/1995 | Vaynberg ..................... 62/175 |
| 6,018,961 A | * | 2/2000 | Venture et al. .............. 62/434 |

\* cited by examiner

Primary Examiner—William C. Doerrler
(74) Attorney, Agent, or Firm—Crowell & Moring LLP

(57) ABSTRACT

A low temperature waste crushing system including a low temperature freezing section for cooling waste material below the cold shortness transition temperature by receiving a supply of refrigeration from a heat sink, and a crushing section for crushing the material cooled in the low temperature freezing section by taking advantage of cold shortness. The low temperature freezing section is configured in dual steps, the preceding step being supplied with the higher temperature refrigeration of the first refrigerating cycle and the succeeding step being supplied with the lower temperature refrigeration of the second refrigerating cycle. The heat sink is configured in a binary refrigeration cycle including a first cycle of ammonia refrigerant for obtaining the first refrigeration temperature, which is higher that the cold shortness transition temperature; and a second cycle of hydrocarbon refrigerant for obtaining a second refrigeration temperature, which is lower in temperature that the cold shortness transition temperature. The device is able to reduce the burden to the environment in comparison with prior art cooling systems.

8 Claims, 3 Drawing Sheets

LOW TEMPERATURE WASTE CRUSHING SYSTEM TAKING ADVANTAGE OF COLD SHORTNESS

BACKGROUND OF THE INVENTION

1. Field of the Invention

The present invention relates to a low temperature waste crushing system for crushing waste tire, plastics, etc., by taking advantage of cold shortness, specifically a system effectively utilizing a cascaded refrigerating system.

2. Description of the Related Art

A crushing method taking advantage of cold shortness in which iron and steel materials, etc., are cooled by, for example, very low temperature cooling medium such as liquid nitrogen below their cold shortness transition temperature to reduce them to a brittle state like glass, and crushed, is disclosed in Japanese Unexamined Patent publication No. Sho 51-39452.

Similarly, in the case of waste tire and plastics and the like, it is enough to cool them below their cold shortness transition temperatures which are about −70° C.~−75° C. for crushing Presently, almost all of the cooling method adopted is to cool them to a very low temperature by spraying liquid nitrogen (−196° C.) on them before crushing.

The conventional crushing system at low temperature using the low temperature liquid nitrogen is shown in FIG. 3. It is composed of a material supplying section 50, a heat sink for supplying liquid nitrogen, a liquid nitrogen freezer 52 in which the material 50a of about 20° C. supplied from the material supplying section 50 is cooled to be reduced to the frozen material 52a of about −130° C. by spraying with liquid nitrogen 51a of about −196° C. supplied from the heat sink 51, and a crushing section 53 in which crushed product 53a of about −75° C. is obtained by crushing the frozen material 52a.

In the liquid nitrogen freezer 52, liquid nitrogen is sprayed on the material 50a and the nitrogen gas gasified through spraying is exhausted to the atmosphere by an exhaust blower or the like not shown in the drawing. In the crushing section 53, the frozen material 52a of about −130° C. is raised in temperature by the heat generated at crushing to be reduced to the crushed product 53a of about −75° C.

The conventional method using liquid nitrogen, has the advantage that liquid nitrogen is comparatively cheap and easy to handle. However, it has a problem which makes it not the best system for environmental hygiene because the nitrogen gas used for freezing the waste material for low temperature crushing is exhausted to the atmosphere. Further, in the case liquid nitrogen is used, there is a problem that a stepwise cooling of high efficiency is not possible and that a heat sink of −196° C. is used for obtaining a frozen material of about −75° C. or lower which is the glass transition temperature of the material.

Moreover, a cooling mechanism for absorbing the heat generated in crushing is not provided at the crushing section Thus, the frozen material is heated at crushing, and necessitates a setting and securing of the frozen temperature which takes the change of quality of the material due to temperature rise at the crushing into consideration.

To solve these problems of the prior art, an art is disclosed in Japanese Unexamined Patent Publication No. Hei 7-88461. Here, a system for crushing waste household electrical appliances and the like at low temperature by utilizing refrigeration is shown. Firstly, liquid nitrogen is supplied from the lower temperature side and lumps of metal are cooled to below −100° C. by the latent and sensible heat of liquid nitrogen. Then plastic materials are cooled to −40° C. by the sensible heat of the gasified nitrogen. Further, the flon used for flon refrigerating cycle is cooled to −20° C. by the sensible heat of the nitrogen gas after cooling the plastic materials, and the nitrogen gas having finished cooling is introduced to a crushing device to be used as anti-explosion purge gas.

However, also in this prior art, the nitrogen gas used for freezing for crushing at a low temperature is finally exhausted to the atmosphere. Therefore, as is the case with the aforementioned art, this prior art can not be said to be a superior system from the viewpoint of environmental hygiene.

SUMMARY OF THE INVENTION

The present invention was made in light of the problems mentioned above, and an object is to provide a low temperature crushing system without using liquid nitrogen, which reduces burden to the environment in comparison with the prior art of cooling with liquid nitrogen.

Another object of the present invention is to provide a crushing system at freezing low temperature, which enables bringing efficiency to cooling by adopting stepwise cooling along with effective removal of the heat generated at crushing.

The present invention is a low temperature crushing system having a low temperature freezing section, for cooling material below its cold shortness transition temperature (glass transition temperature at which low-temperature embrittlement occurs) by receiving the supply of refrigeration from a heat sink and a crushing section for crushing the material cooled in the low temperature freezing section by taking advantage of cold shortness, and characterized in that the heat sink is configured as a binary refrigerating cycle combining two different refrigeration cycles, the first refrigerating cycle for obtaining the first refrigeration (hereinafter referred to as higher temperature refrigeration) higher in temperature than the cold shortness transition temperature and the second refrigerating cycle for obtaining the second refrigeration (hereinafter referred to as lower temperature refrigeration) lower in temperature than the cold shortness transition temperature, the low temperature freezing section is configured as a dual step cooling section, the preceding and succeeding step, each of which received refrigeration of different temperatures, and the preceding step of the dual step cooling section is supplied with the higher temperature refrigeration of the first refrigerating cycle and the succeeding step is supplied with the lower temperature refrigeration of the second refrigerating cycle.

The binary refrigerating cycle is preferably configured as a cascaded binary refrigerating cycle combining two different cycles, the first refrigerating cycle for obtaining the higher temperature refrigeration and the second refrigerating cycle for obtaining the lower temperature refrigeration by introducing the higher temperature refrigeration to its condenser.

Further preferably, the cascaded binary refrigerating cycle comprises a higher temperature condensing unit configured as the first refrigerating cycle which uses ammonia as a refrigerant and a lower temperature condensing brine unit configured as the second refrigerating cycle which uses a refrigerant of hydrocarbon group such as ethane and methane, the higher temperature condensing unit supplies a part of the latent heat of vaporization of ammonia refrigerant to the load of the preceding step of the dual step cooling section and at the same time introduces the remainder to the condensing part of the lower temperature condensing brine unit to make the condensing part a cascade condenser, and the lower temperature condensing brine unit supplies to the load of the succeeding step of the dual step cooling section the low temperature brine cooled in a brine cooler to which the ethane refrigerant condensed in the cascade condenser is supplied.

The two step cooling section suitably comprises:

a pre-cooling room in which the waste material is pre cooled by the first cooling air which is produced by supplying the higher temperature refrigeration of the first refrigerating cycle to the air cooler of the preceding step and is higher in temperature than the cold shortness transition temperature; and a lower temperature cooling room in which the pre-cooled waste material is cooled to a temperature lower than the cold shortness transition temperature by the second cooling air which is produced by supplying the lower temperature refrigeration to the air cooler of the succeeding step and is lower in temperature than the cold shortness transition temperature.

Further preferably, the dual step cooling section comprises:

a transfer belt for transferring waste material, and nozzles for forming air jet provided above the belt along the direction of the transfer and divided in preceding and succeeding group along the direction of transfer; a plurality of air coolers for cooling the air to be supplied to each group of nozzles; and a tunnel covering these; and the dual step cooling freezer is so configured that the higher temperature refrigeration is supplied to the air cooler which supplies the air to the preceding group of the nozzles and the lower temperature refrigeration to the air cooler which supplies the air to the succeeding group of the nozzles.

The crushing section is suitably provided with a crushing machine in which the frozen waste material is crushed while removing the heat generated at crushing through blowing the air of low temperature below the cold shortness transition temperature produced by the lower temperature refrigeration into the crushing machine.

Hereinbelow, the present invention will be described in a concrete manner.

With refrigerant such as ammonia and the like generally used in a conventional refrigerating cycle, as the specific volume of evaporated vapor is very large when the evaporation temperature is about −70° C. and below, the use of refrigerant such as methane, ethane, and the like whose specific volume of saturated vapor is small becomes necessary. However, sufficient refrigerating effect and capacity can not be obtained with the refrigerating cycle using only these refrigerants. With this being the situation, the present invention is configured as a binary refrigerating cycle, in which the higher temperature side refrigerating cycle uses a generally used refrigerant with a high refrigerating capacity, more specifically, ammonia refrigerant to condense the compressed refrigerant gas (ethane) in the lower temperature side refrigerating machine and heat exchange is performed between the evaporator of the higher temperature side refrigerating machine and the condenser of the lower temperature side refrigerating machine in the cascade condenser to condense the lower temperature side refrigerant.

Thus, the higher temperature is efficiently obtained by the first refrigerating cycle using generally used refrigerant such as ammonia and the like, and the lower temperature refrigeration is obtained by the second refrigerating cycle using refrigerant such as methane, ethane, and the like whose specific volume of saturated vapor is small. With the dual step cooling by the higher temperature refrigeration and the lower temperature refrigeration, the cooling load of the lower temperature side is lightened.

Particularly, the present invention uses the binary refrigerating cycle instead of conventional cooling and freezing by releasing liquid nitrogen, and cools the waste material stepwise to the cold shortness transition temperature by the air cooled by heat exchange. As cooled air is used as coolant for cooling waste material, the coolant can be exhausted in an as-is status without any harm to the environment. Cooling to the cold shortness transition temperature of below −70° C. is possible, although air which holds substantially small cold energy compared with liquid nitrogen is used, for the configuration of dual step cooling is adopted, which is made possible by the use of the binary refrigerating cycle.

Further particularly, the heat sink of the present invention is configured so that ammonia refrigerant whose evaporation temperature is high, is used in the first refrigerating cycle to obtain the higher temperature refrigeration; and hydrocarbon group refrigerants such as ethane, methane, and the like are used for the second refrigerating cycle to obtain the lower temperature refrigeration.

In the second refrigerating cycle for obtaining the lower refrigeration, direct heat exchange between cooling air and/or waste material is not done. Instead, HFE (hydrofluoroether), a highly safe, nonflammable inactive liquid of fluorine group, having small earth-warming effect with zero ozone destroying coefficient and short life in the air, is used as brine and the low temperature cooling is performed by the brine Thus, the danger of the inflammation of ethane and the like is excluded when crushing the waste material of the temperature below its cold shortness transition point in the crushing section Although ammonia refrigerant is used, as the pre-cooling of the waste material is performed by the air produced through heat exchange with the ammonia refrigerant, the configuration of the hermetically sealed refrigerating cycle is possible without the danger of ammonia leak, which is very desirable for the environment.

Thus, the present invention is configured as the following: a part of the latent heat of evaporation of the first refrigerating cycle unit for obtaining the higher temperature of refrigeration is introduced to the preceding cooling step for pre-cooling the waste material in the tunnel type freezer; the rest of the latent heat of evaporation is introduced to the condenser part of the lower temperature side condensing brine unit which is the second refrigerating cycle for obtaining the lower temperature refrigeration. Hereby, the cascade condenser is formed and the high pressure, high temperature ethane refrigerant is condensed. Lowe temperature brine of HFE, an inactive liquid, is obtained by the medium of the condensed ethane. This low temperature brine is used as a lower temperature heat sink at the succeeding cooling step of the dual step cooling section, as well as for cooling the air to be used for removing the heat generated at the crushing.

By the configuration of the dual step, the tunnel type freezer as set forth in claim 1 is composed of the pre-cooling room formed in the preceding step and the lower temperature cooling room formed in the succeeding step, and so the cooling load of the lower temperature cooling in the succeeding step is lightened by the pre-cooling.

The crushing section is so configured that the crushing is performed while removing the heat generated at crushing by blowing on the waste material the cold air which is lower in temperature than the cold shortness transition temperature and produced through the medium of the lower temperature heat sink. By blowing the cold air lower in temperature than the cold shortness transition temperature in the crushing process, the removal of the heat generated at crushing and the fracture in low temperature are promoted, and welding of the crushed material and deterioration of the material due to the heat generated at crushing are also prevented.

It is preferable for the removal of the heat generated at crushing to cool the jacket of the crushing section in addition to blow the cold air in the crushing machine.

Figure 1:
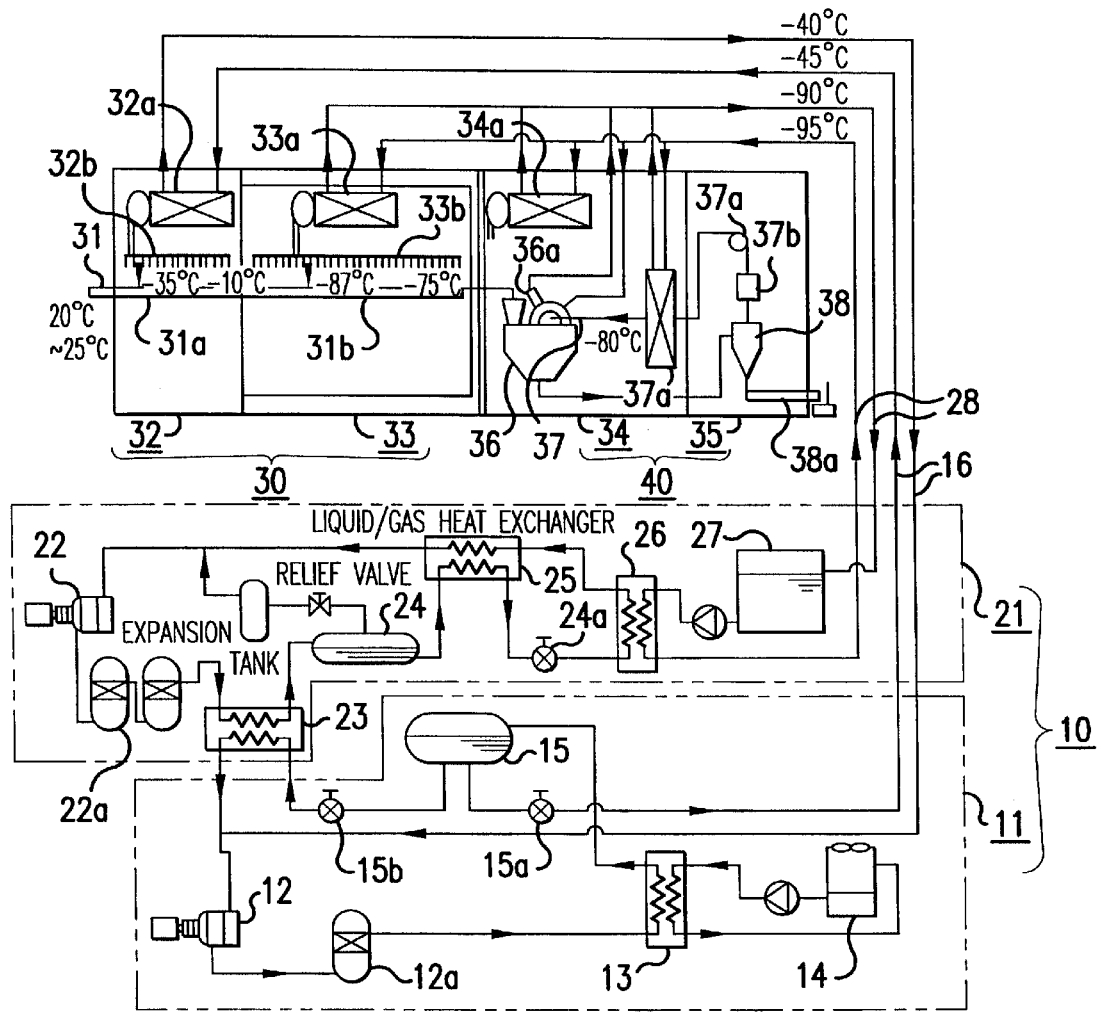
FIG. 1 is a diagrammatic sketch showing the configuration of the binary freezing low temperature crushing system taking advantage of cold shortness according to the present invention.

In the drawings reference numeral 10 denotes heat sink, 11 higher temperature condensing unit, 12 higher temperature side compressor, 13 condenser, 15 higher temperature side receiver, 16 higher temperature heat sink, 21 lower temperature condensing unit, 22 lower temperature side compressor, 23 cascade condenser, 24 lower temperature side receiver, 26 brine cooler, 28 lower temperature heat sink, 30 freezer, 31 material supply section, 32 pre-cooling room, 33 lower temperature cooling room, 34 crushing room, 35 separating room, 36 crushing machine, 37 cold air, 40 crushing section.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so fort of the constituent parts described in the embodiments shall be interpreted as illustrative only not as limitative of the scope of the present invention.

Figure 2:
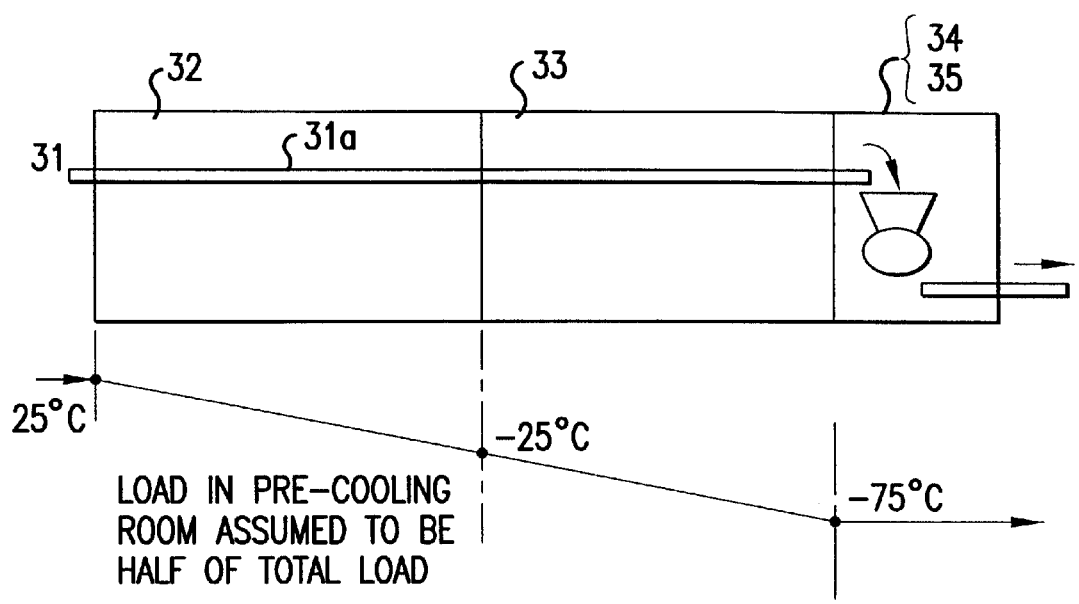
FIG. 2 is a diagram showing the change in temperature of the material to be crushed in the crushing system of FIG. 1.
Figure 3:
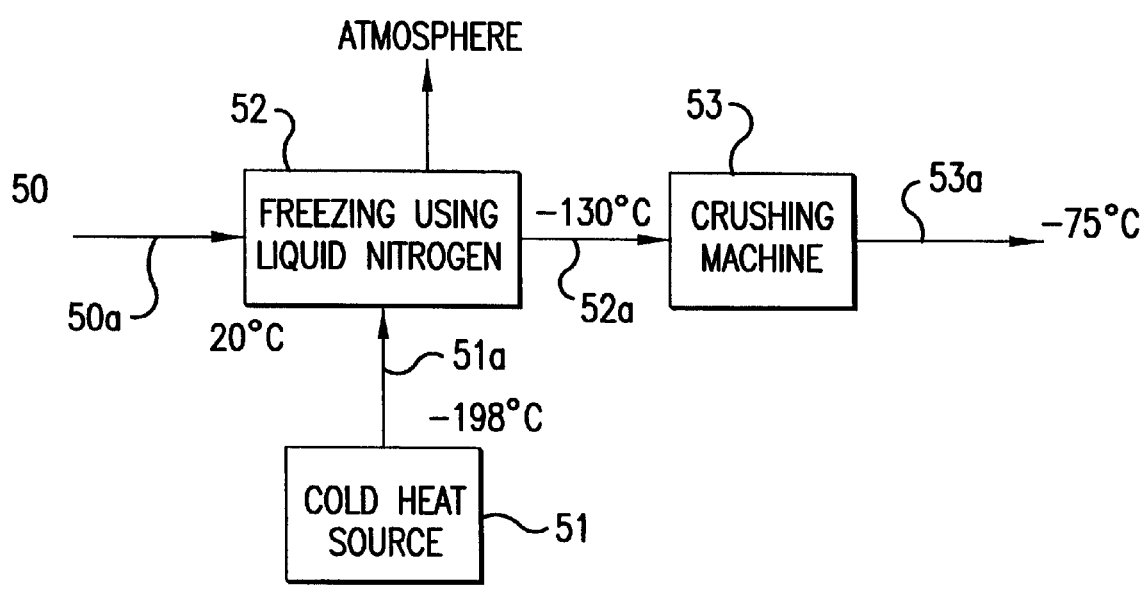
FIG. 3 is a diagrammatic sketch showing a conventional low temperature crushing system.

FIG. 1 is a diagrammatic sketch showing the overall configuration of the binary freezing low temperature crushing system taking advantage of cold shortness according to the present invention and FIG. 2 is a diagram showing the change in temperature of the material to be crushed in the crushing system of FIG. 1.

As shown in FIG. 1, the binary freezing low temperature crushing system according to the present invention is a low temperature crushing system composed of a freezer 30 for cooling waste material below its cold shortness transition temperature (glass transition temperature at which low-temperature embrittlement occurs) by receiving the supply of refrigeration from a heat sink 10, and a crushing section 40 for crushing the material cooled by the freezer 30 by taking advantage of cold shortness. The heat sink 10 for the freezer 30 is configured as a binary refrigerating cycle combining two different refrigerating cycles, the first refrigerating cycle for obtaining the first refrigeration (hereinafter referred to as higher temperature higher refrigeration) higher in temperature than the cold shortness transition temperature and the second refrigerating cycle for obtaining the second refrigeration (hereinafter referred to as lower temperature refrigeration) lower in temperature than the cold shortness transition temperature.

The first refrigerating cycle is configured as a higher temperature condensing unit 11 which uses ammonia refrigerant, and the second refrigerating cycle is configured as a lower temperature condensing brine unit 21.

The main components of the higher temperature condensing unit 11 are: a compressor of the first refrigerating cycle of higher temperature side for compressing ammonia refrigerant; an oil separator 12a for separating the oil from the compressed, high pressure, high temperature ammonia gas; a condenser 13 for condensing the compressed, high pressure, high temperature ammonia gas after separation of the oil through the heat exchange with the cooling medium cooled in a cooling tower 14; and a higher temperature side receiver 15 for storing the condensed liquid A part of the condensed ammonia liquid stored in the higher temperature side receiver 15 is sent by way of an expansion valve 15a to an air cooler 32a, forming a higher temperature heat sink 16 of −40° C.~−50° C. which is higher than the cold shortness transition temperature. Then, ammonia gas of about −45° C. is supplied to the air cooler 32a in a pre-cooling room 32 of the freezer 30. At the air cooler 32a, air is cooled to −40° C.~−35° C. to be jetted from nozzles 32b arranged along the direction of transfer of the conveyor toward the surface of the conveyor 31a in forms of impinging air jets of −35° C.

A part of the condensed ammonia liquid stored in the higher temperature side receiver 15 is sent by way of an expansion valve 15b to a cascade condenser 23, where mixed liquid-gas ammonia evaporates to be released of its latent heat of evaporation. Then, the compressed ethane gas of high temperature and high pressure sent from a lower temperature side compressor 22 by way of an oil separator 22a is condensed, and the condensed liquid ethane is stored in a lower temperature side receiver 24.

The stored condensed liquid ethane is sent to a brine cooler 26 by way of an expansion valve 24a to produce low temperature brine of about −95° C. This low temperature brine is supplied by way of a brine tank 27 to an air cooler 33a of a lower temperature cooling room 33 of the freezer 30 and to an air cooler 34a, 37c of the crushing section 40 as lower temperature heat sink 28.

Low temperature brine of −95° C. may be used with HFE (hydrofluoroether) whose safety is high, in addition to ethyl ether Rll, and the like. Any of these is circulated between the brine tank 27 and the air cooler 33a of the lower temperature cooling room 33, the air cooler 34a, 37c of the crushing section 40.

At the air cooler 33a of the lower temperature cooling room 33, air is cooled to −85° C.~−90° C. by the low temperature brine of about −95° C. to be jetted from nozzles 33b arranged along the direction of transfer of the conveyor toward the surface of the conveyor 31b in forms of impinging air jets of about −87° C.

The freezer 30 is a tunnel-shaped freezer covering the circumference of the freezing section, in which the material to be crushed, for example, waste rubber tire, supplied from a material supply section 31 is transferred to the crushing section 40 on the conveyor belt 31a, 31b, while being cooled firstly by the impinging air jet of −35° C. to the neighborhood of −10° C.~−30° C., then by the impinging air jet of about −87° C. finally to below about −75° C. As described above, the freezer 30 is provided with a pre-cooling room 32 and a lower temperature cooling room 33. Each cooling room is provided with an air cooler 32a which connects with the higher temperature heat sink 16 and an air cooler 33a which connects with the lower temperature heat sink 28 respectively; and a number of groups of multi-air-nozzles 32b and 33b, each group of 32b and 33b being arranged in parallel with the transfer direction and side by side in the direction perpendicularly to the transfer direction, respectively. The air cooled in the air coolers are supplied the nozzles 32b and 33b to form the impinging air jet of about −350° C. and −870° C., respectively, which air jets cool the waste material with high efficiency by turbulent effect at impinging against the surface of the waste material of 20° C.~25° C.

The material, for example, pieces of rubber, is supplied at the supply section 31, pre-cooled by using the cold air (impinging air jet) of about −35° C. in the pre-cooling room 32, and then cooled by using the cold air (impinging air jet) of about −87° C. Thereby, a frozen material of about −75° C., lower than the cold shortness transition temperature, is obtained at the exit of the freezer 30.

The freezer panel of the tunnel-shaped freezer is of double shell construction to reduce heat transfer through the panel and the refrigeration loss in the freezer is reduced to the minimum.

The crushing section 40 is composed of a crushing room 34 in which the frozen material cooled to about −750° C., a temperature below the cold shortness transition temperature, is charged into a crushing machine 36 to be crushed; and a separation room 35 for separating fine-grained material from the crushed material.

In the crushing room 34 are provided the air cooler 34a which keeps the room temperature below about 0° C. and the air cooler 37c which produces the cold air 37 of about −80° C., a temperature below the cold shortness transition temperature, by cooling the air supplied from a blower 37a provided in the separation room 35. In the crushing machine 36 is provided a cooling jacket 36a for introducing the low temperature brine of the lower temperature heat sink 28, and the low temperature brine absorbs the heat generated at crushing together with the blown-in cold air.

In the separation room 35 are provided a cyclone 38 for obtaining fine-crushed material pieces through gas/solid separation of the crushed material exhausted together with the cold air 37 of −80° C. from the crushing machine 36, a filter 37b, the blower 37a, and a screw feeder 38a for taking out the fine-crushed material pieces.

FIG. 2 shows the change in temperature of the material to be crushed in the case the binary freezing low temperature crushing system taking advantage of cold shortness. As can be seen in FIG. 2, in the case the load in the pre-cooling room 32 is set to half the total load, the temperature of the material decreases virtually linearly to −75° C. As the heat generated at crushing is efficiently removed by blowing the cold air lower in temperature than the cold shortness transition temperature in the course of crushing, the crushed material is able to be supplied without change in temperature to the succeeding process.

It is preferable to use as the brine used for the lower temperature heat sink, HFE (hydrofluoroether) which is a highly safe, nonflammable inactive liquid of fluorine group, having small earth-warming effect with zero ozone destroying coefficient and short life in the air.

According to the configuration described above, in comparison with the cooling using liquid nitrogen, the burden to the environment is reduced by the use of the binary refrigerating cycle of ammonia and ethane. Moreover, the ammonia and ethane refrigerants are used in the hermetically sealed refrigerating cycle, and the lower temperature heat sink produced in the refrigerating cycle using ethane refrigerant is supplied to the air cooler 33a of the lower temperature cooling room 33 of the freezer 30 by the medium of the low temperature brine.

Thus, the refrigeration supplied to the pre-cooling room 32, the lower temperature cooling room 33, the crushing section 40, and to the inside of the crushing machine 36 is that of cold air. Hence, as only air is used as coolant to cool the waste material, the exhaustion of the coolant is of no problem to the environment.

By adopting stepwise cooling according to the embodiment of the present invention, the material is enabled to be efficiently cooled below the glass transition temperature at which cold shortness occurs. Furthermore, according to the embodiment of the present invention, effective removal of the heat generated at crushing is enabled by blowing the cold air lower in temperature than the glass transition temperature, providing high effectiveness in a wide range of low temperature crushing not limited to crushing waste tire and the like.

What is claimed is:

1. A low temperature waste crushing system having a low temperature freezing section for cooling material below its cold shortness transition temperature by receiving a supply of refrigeration from a heat sink and a crushing section for crushing the material cooled in the low temperature freezing section by taking advantage of cold shortness, wherein the heat sink is configured as a binary refrigerating cycle combining two different refrigerating cycles, the first refrigerating cycle for obtaining a first refrigeration higher in temperature than the cold shortness transition temperature and the second refrigerating cycle for obtaining a second refrigeration lower in temperature than the cold shortness transition temperature, the low temperature freezing section is configured as a dual steps cooling section comprising a preceding and a succeeding step, each of which receives refrigeration of different temperatures;

the preceding step of the dual steps cooling section is supplied with the higher temperature refrigeration of the first refrigerating cycle and the succeeding step is supplied with the lower temperature refrigeration of the second refrigerating cycle;

the binary refrigerating cycle is cascaded and comprises a higher temperature condensing unit configured as the first refrigerating cycle which uses ammonia as refrigerant and a lower temperature condensing unit configured as the second refrigerating cycle which uses a hydrocarbon refrigerant, the higher temperature condensing unit supplies a part of the latent heat of vaporization of ammonia refrigerant to the load of the preceding step of the dual steps cooling section and at the same time introduces the remainder to the condensing part of the lower temperature condensing unit to make the condensing part a cascade condenser, and the lower temperature condensing unit supplies to the load of the succeeding step of the dual steps cooling section a low temperature brine cooled in a brine cooler to which the hydrocarbon refrigerant condensed in the cascade condenser is supplied.

2. A low temperature waste crushing system according to claim 1, wherein the binary refrigerating cycle is configured as a cascaded binary refrigerating cycle combining two different refrigerating cycles, the first refrigerating cycle for obtaining the higher temperature cold heat and the second refrigerating cycle for obtaining the lower temperature cold heat by introducing the higher temperature cold heat to its condenser.

3. A low temperature waste crushing system according to claim 1, wherein the two steps cooling section comprises:
   a pre-cooling room in which the waste material is pre-cooled by the first cooling air which is produced by supplying the higher temperature cold heat of the first refrigerating cycle to the air cooler of the preceding step and is higher in temperature than the cold shortness transition temperature; and
   a lower temperature cooling room in which the pre-cooled waste material is cooled to a temperature lower than the cold shortness transition temperature by the second cooling air which is produced by supplying the lower temperature cold heat to the air cooler of the succeeding step and is lower in temperature than the cold shortness transition temperature.

4. A low temperature waste crushing system having a low temperature freezing section for cooling material below its cold shortness transition temperature by receiving a supply of refrigeration from a heat sink and a crushing section for crushing the material cooled in the low temperature freezing section by taking advantage of cold shortness, wherein
   the heat sink is configured as a binary refrigerating cycle combining two different refrigerating cycles, the first refrigerating cycle for obtaining a first refrigeration higher in temperature than the cold shortness transition temperature and the second refrigerating cycle for obtaining a second refrigeration lower in temperature than the cold shortness transition temperature,
   the low temperature freezing section is configured as a dual steps cooling section comprising a preceding and a succeeding step, each of which receives refrigeration of different temperatures,
   the preceding step of the dual steps cooling section is supplied with the higher temperature refrigeration of the first refrigerating cycle and the succeeding step is supplied with the lower temperature refrigeration of the second refrigerating cycle;
   the dual steps cooling system comprises a transfer belt for transferring waste material; nozzles for forming air jet provided above the belt along the direction of transfer and divided into a preceding and a succeeding group along the direction of transfer; a plurality of air coolers for cooling the air to be supplied to each group of nozzles; and a tunnel covering these; and
   the dual steps cooling freezer is so configured that the higher temperature refrigeration is supplied to the air cooler which supplies the air to the preceding group of the nozzles and the lower temperature refrigeration is supplied to the air cooler which supplies the air to the succeeding group of the nozzles.

5. A low temperature waste crushing system according to claim 1, wherein the crushing section is provided with a crushing machine in which the frozen waste material is crushed while removing the heat generated at crushing through blowing the air of low temperature below the cold shortness transition temperature produced by the lower temperature cold heat into the crushing machine.

6. A low temperature waste crushing system according to claim 4, wherein the binary refrigerating cycle is configured as a cascaded binary refrigerating cycle combining two different refrigerating cycles, the first refrigerating cycle for obtaining the higher temperature refrigeration and the second refrigerating cycle for obtaining the lower temperature refrigeration by introducing the higher temperature refrigeration to its condenser.

7. A low temperature waste crushing system according to claim 4, wherein the two steps cooling section comprises:
   a pre-cooling room in which the waste material is pro cooled by the first cooling air which is produced by supplying the higher temperature refrigeration of the first refrigerating cycle to the air cooler of the preceding step and is higher in temperature than the cold shortness transition temperature; and
   a lower temperature cooling room in which the pre-cooled waste material is cooled to a temperature lower than the cold shortness transition temperature by the second cooling air which is produced by supplying the lower temperature refrigeration to the air cooler of the succeeding step and is lower in temperature than the cold shortness transition temperature.

8. A low temperature waste crushing system according to claim 4, wherein the crushing section is provided with a crushing machine in which the frozen waste material is crushed while removing the heat generated at crushing through blowing the air of low temperature below the cold shortness transition temperature produced by the lower temperature refrigeration into the crushing machine.

* * * * *